(12) United States Patent
Johnson

(10) Patent No.: US 8,296,996 B2
(45) Date of Patent: Oct. 30, 2012

(54) WATER AND NUTRIENT DELIVERY DEVICE

(76) Inventor: Michael S. Johnson, South Wirral (GB)

( * ) Notice: Subject to any disclaimer, the term of this patent is extended or adjusted under 35 U.S.C. 154(b) by 9 days.

(21) Appl. No.: 12/733,150

(22) PCT Filed: Aug. 13, 2008

(86) PCT No.: PCT/US2008/009654
§ 371 (c)(1),
(2), (4) Date: Feb. 12, 2010

(87) PCT Pub. No.: WO2009/023203
PCT Pub. Date: Feb. 19, 2009

(65) Prior Publication Data
US 2010/0139158 A1   Jun. 10, 2010

(30) Foreign Application Priority Data
Aug. 16, 2007   (GB) .................................. 0716010.4

(51) Int. Cl.
*A01G 29/00*   (2006.01)

(52) U.S. Cl. ....................................................... 47/48.5

(58) Field of Classification Search ................... 47/48.5, 47/57.6, DIG. 9, 11
See application file for complete search history.

(56) References Cited

U.S. PATENT DOCUMENTS

| | | | | |
|---|---|---|---|---|
| 3,698,133 A * | 10/1972 | Schreiber | ...................... | 47/57.6 |
| 4,495,724 A * | 1/1985 | Kirkland et al. | ................ | 47/57.6 |
| 4,905,411 A * | 3/1990 | Finch-Savage | ................ | 47/57.6 |
| 5,799,439 A * | 9/1998 | MacGregor | ...................... | 47/57.6 |
| 5,993,505 A * | 11/1999 | Tijsma et al. | ................. | 71/64.11 |
| 6,058,649 A * | 5/2000 | Bittman et al. | ................. | 47/57.6 |
| 2006/0150489 A1* | 7/2006 | Legro et al. | ..................... | 47/57.6 |

* cited by examiner

*Primary Examiner* — Rob Swiatek
*Assistant Examiner* — Ebony Evans
(74) *Attorney, Agent, or Firm* — Paul R. Martin

(57) ABSTRACT

A device for delivery of water and at least one further compound which comprises at least one first part containing at least one first compound; at least one second part substantially surrounding said first part, the or each second part being at least partially permeable to water and to the or at least one first compound; and at least one third part substantially surrounding said second part, the or each third part including a water absorbent material.

18 Claims, 1 Drawing Sheet

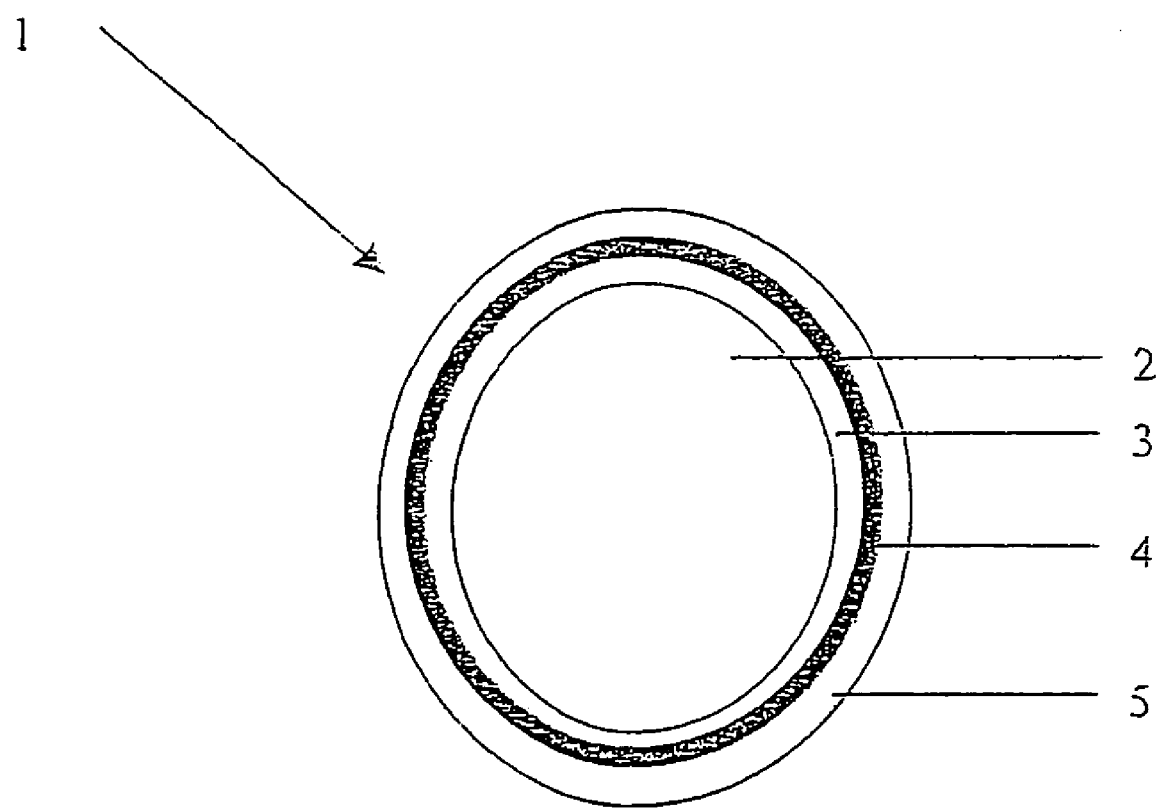

WATER AND NUTRIENT DELIVERY DEVICE

TECHNICAL FIELD AND INDUSTRIAL APPLICABILITY OF THE INVENTION

The present invention relates to a water and nutrient delivery device and particularly, but not exclusively, to a device for the delivery of water and plant nutrients to the roots of a plant.

BACKGROUND OF THE INVENTION

In order that a plant is able to grow efficiently it is important that it is supplied with water and nutrients. Nutrients are often added to a plant growing medium, such as soil, in the form of fertilisers. Because it is difficult to direct fertilisers only around the roots of a plant, these nutrients are applied in excess in order to ensure sufficient supply to the roots to allow efficient take up. However, such excessive fertilisation may have environmental impacts, in particular under conditions of heavy rain nutrients may be washed from the soil to water courses. Such an excess of nutrients in a water course can lead to problems such as eutrophication, where plant growth in a water course is accelerated due to the excess of nutrients.

In an attempt to overcome this problem controlled release fertilisers have been developed in which a granule of one or more fertilisers is encapsulated within a layer of a compound which allows water to pass through it but restricts the movement of the fertiliser in solution. The rate of outflow of nutrient solution through the selectively permeable layer is typically controlled by temperature, the layer having pores therein which expand upon heating thereby allowing the nutrient solution to pass through. The controlled release fertiliser system suffers from the disadvantage that the nutrients passing through the selectively permeable layer are in a saturated solution. If the water of this solution evaporates it leaves the nutrient in a crystalline form making it unavailable to the plant. Furthermore, at times of excess water in the soil, the nutrients may well be leached away from the plant before they can be absorbed.

In locations where a lack of water is also a problem irrigation of plants may be undertaken. However, the regular supply of water for plants in locations where water is inherently scarce is expensive, wasteful of resources and potentially damaging to downstream environments. In such locations super absorbent polymer, capable of retaining large volumes of water, may be used. Such polymers absorb large quantities of water and can retain them against evaporation far more efficiently than soil alone. Where nutrient is also required the polymer may be loaded with such nutrients by soaking the polymer in a concentrated solution of a fertiliser and subsequently dehydrating it. This process is repeated in order to maximise the quantity of nutrient in the polymer structure. As a result, this is an expensive process and it is not possible to provide the super absorbent polymer with sufficient loading of nutrients to supply the long term needs of the plants. Furthermore, the super absorbent polymers also suffer from the disadvantage that the nutrient is easily lost and a large proportion of the fertiliser may be dumped from the super absorbent polymer upon the first significant rainfall.

SUMMARY OF THE INVENTION

Preferred embodiments of the present invention seek to overcome the above described disadvantages of the prior art.

According to a first aspect of the present invention there is provided a device for delivery of water and at least one further compound, the device comprising:

at least one first part containing at least one first compound;

at least one second part substantially surrounding said first part, the or each second part being at least partially permeable to water and to the or at least one first compound; and at least one third part substantially surrounding said second part, the or each third part including a water absorbent material.

By encapsulating a first component, for example a granule of fertiliser, with a partially permeable coating and then encapsulating the partially permeable coating with a further coating of water absorbent material, such as a super absorbent polymer, the advantage is provided that the transfer of the first compound from within the first part of the device to the third part and to outside of the device is regulated. In particular, the absorbent layer protects against large fluctuations in the release of the nutrient. For example at times of significant rainfall water is absorbed, and stored, in the super absorbent polymer. Water is then able to pass from the super absorbent polymer through the permeable layer and into the fertiliser granule. The nutrient is then dissolved into the water and the water molecules and nutrient ions are able to pass through the permeable layer back into the super absorbent polymer. Therefore, nutrient becomes available to the roots of a plant which can tap directly into the super absorbent polymer and take up both water and nutrient ions. Alternatively the nutrient solution can transfer from the super absorbent polymer into a surrounding growing medium. Such a transfer is at a relatively slow rate when compared to the prior art and therefore the quantity of nutrient transferred to the growing medium is relatively small. As a result the likelihood of excessive leaching of nutrients into the soil and further onto adjacent water courses is reduced. This not only has environmental benefits reducing problems such as eutrophication but also reduces the amount of fertiliser required to provide the same degree of fertilisation, therefore reducing the cost. The above described system also provides an advantage over the nutrient loaded super absorbent polymer prior art in that repeated supplies of nutrient are available from the first part of the device. Typically when the device is introduced into a poor quality growing medium, the roots of a plant will seek out and directly tap into the super absorbent polymer, thereby being supplied with water and nutrients at a constant rate virtually irrespective of the external environmental conditions. As a result, the device is capable of making infertile soil which is prone to drought conditions significantly more fertile than is possible with the above described prior art.

The at least one said first compound may be chemically and/or biologically active.

In a preferred embodiment, at least one said first compound comprises a respective nutrient.

In another preferred embodiment, at least one said nutrient comprises a plant nutrient.

The second part may be selectively permeable.

By making the second component selectively permeable the advantage is provided that the rate of release of different compounds within the first part may be controlled.

In a preferred embodiment, said permeability is dependent upon environmental conditions.

In another preferred embodiment, at least one said environmental condition is temperature.

By making the permeability of the second part temperature dependent, the advantage is provided that in warmer weather when growing conditions are more favourable and plants can take up more nutrient the device releases more nutrient. Thus making most efficient use of the nutrient supply.

In a preferred embodiment, said second part is a thermo-elastic material.

In another preferred embodiment, said third part is a super-absorbent polymer.

The device may further comprise at least one fourth part substantially surrounding said third part.

In a preferred embodiment, said fourth part comprises a protective coating.

According to another aspect of the present invention there is provided a method for producing a device for delivery of water and at least one further compound, the method comprising the steps of:—
   applying a coating of a least one water absorbent material to a substrate comprising at least one first part containing at least one first compound and at least one second part substantially surrounding said first part, the or each second part being at least partially permeable to the or at least one first compound.

The method may further comprise the step of applying said second part to said first part prior to the application of said water absorbent material.

DESCRIPTION OF THE INVENTION

A preferred embodiment of the present invention will now be described, by way of example only, and not in any limitative sense, with reference to FIG. 1 in which a cross-sectional view of a device of the present invention is shown.

A device 1 for delivery of water and at least one further compound has a first part, or core 2, a second part 3 substantially covering said core 2, the second part, or permeable coating 3, being at least partially permeable to water and to at least one said first compound. The device 1 also has a third part substantially surrounding said permeable coating, the third part, or absorbent layer, 4, including a water absorbent material. The device also has a fourth part, or protective coating 5.

Typically the core 2 is a plant fertiliser and permeable coating 3 is a nylon coating having pores therein. The water absorbent material is typically a super absorbent hydrophilic polymer such as a cross-linked polyacrylamide.

The device may be produced by taking a fertiliser in granular form and applying a resin coating. The resin coating is normally applied in conjunction with fatty acids which form microscopic globules within the resin. These fatty acids are then removed by the application of a metal hydroxide to leave pores in the resin. Fertiliser granules may also be purchased in this form. Next the external surface of the coated fertiliser granule is cleaned using a degreasing agent such as perchlorethylene. The resulting granules are coated with a solution of polyvinyl acetate (PVA) and then introduced into a fluidised bed of dry super absorbent polymer particles heated to around 50° C. Upon contact with the super absorbent polymer the water in the PVA solution is drawn into the crystalline structure of the polymer, thereby holding the coated polymer granule and super absorbent polymer in firm attachment.

Alternatively the degreased resin coated fertiliser granules are introduced into a mixture of the monomer and other components that form the super absorbent polymer and stirred to overcome the immiscibility of the monomer components and to evenly coat the granules. The product is then dried in an air stream and a powder of the super absorbent polymer is applied to maintain separation of the coated granules from the vessel walls and from each other.

In use the device is provided in the coated granular form and mixed with a soil or other growing medium. When this growing medium is watered the water is absorbed by the super absorbent polymer layer 4 and is able to pass through the pores in permeable coating 3 into nutrient core 2. Dissolved nutrient ions are then able to pass through the pores in permeable layer 3 and enter the super absorbent polymer 4. The transfer of the nutrient ions may be controlled, for example, the pore size may prevent some ions passing through the permeable layer. However, movement of the ions may be again possible if the pore size increases, for example, by an increase in temperature.

It will be appreciated by persons skilled in the art that the above embodiment has been described by way of example only, and not in any limitative sense, and that various alterations and modifications are possible without departure from the scope of the invention as defined by the appended claims. It is possible that the core be directly coated with hydrophilic resin then, after damping with water, with the super absorbent polymer alone shortly before or immediately prior to mixing directly into growing media.

What is claimed is:

1. A device for assisting plant growth comprising:
   means for dispensing a nutrient into soil to assist plant growth for plants planted in the soil, said means including
      a core material which is adapted to be buried in soil in which plants are planted and which includes a nutrient to be delivered to the plants buried in the soil in a regulated manner, the nutrient in said core material being activated when contacted by water,
      a partially water-permeable coating on said core, and
      a water-absorbent coating encapsulating said partially water-permeable coating and said core material, said water-absorbent coating absorbing and storing water from the soil to store water during periods of significant rainfall, said water-absorbing coating and said partially water-permeable coating on said core co-operating with each other to transfer water to the core material in a regulated manner to activate the nutrient in a regulated manner;
   said partially water-permeable coating and said water-absorbing coating being permeable to activated nutrient in said core material and regulating transfer of activated nutrient in said core material through said partially water-permeable coating and through said water-absorbent coating so that water is absorbed from the soil and transferred to the nutrient in a regulated manner to activate the nutrient in said core material and activated nutrient is transferred from said core material to the soil in a regulated manner.

2. A device according to claim 1, wherein said nutrient is chemically active.

3. A device according to claim 1, wherein said nutrient is biologically active.

4. A device according to claim 1, wherein said nutrient comprises a respective nutrient.

5. A device according to claim 4, wherein said nutrient comprises a plant nutrient.

6. A device according to claim 1 wherein said partially water-permeable coating is selectively permeable.

7. A device according to claim 6, wherein the permeability of said partially water-permeable coating is temperature dependent.

8. A device according to claim 1 wherein said partially water-permeable coating is a thermo-elastic material.

9. A device according claim 1 wherein said water-absorbent coating is a super-absorbent polymer.

10. A device according to claim 1 further comprising a protective coating substantially surrounding said water-absorbent coating encapsulating said partially water-permeable coating and said core material.

11. The device defined in claim 1 wherein the partially water-permeable coating is resin.

12. The device defined in claim 11 wherein the water-absorbent coating is polyvinyl acetate.

13. A device for controllably delivering a nutrient to roots of a plant comprising:
   a core material which is adapted to be buried in soil in which plants are planted and which includes a nutrient to be delivered to the plants buried in the soil in a regulated manner, the nutrient in said core material being activated when contacted by water;
   a partially water-permeable coating on said core;
   a water-absorbent coating encapsulating said partially water-permeable coating and said core material, said water-absorbent coating absorbing and storing water from the soil to store water during periods of significant rainfall, said water-absorbing coating and said partially water-permeable coating on said core co-operating with each other to transfer water to the core material in a regulated manner to activate the nutrient in a regulated manner;
   said partially water-permeable coating and said water-absorbing coating being permeable to activated nutrient in said core material and regulating transfer of activated nutrient in said core material through said partially water-permeable coating and through said water-absorbent coating so that water is absorbed from the soil and transferred to the nutrient in a regulated manner to activate the nutrient in said core material and activated nutrient is transferred from said core material to the soil in a regulated manner.

14. A method for producing a device which assists plant growth comprising:
   providing fertilizer in granular form;
   applying a resin coating to the fertilizer grains;
   coating the external surface of the resin-coated fertilizer grains with a solution of polyvinyl acetate, the solution of polyvinyl acetate having water therein;
   heating a fluidized bed of dry super absorbent polymer particles to around fifty degrees Centigrade, the super absorbent polymer particles containing water;
   introducing the coated grains into the heated fluidized bed of dry super absorbent polymer particles;
   upon the resin-coated fertilizer grains contacting the dry super absorbent polymer particles, drawing water from the polyvinyl acetate coating the external surface of the resin-coated fertilizer grains into the dry super absorbent polymer particles; and
   holding the resin-coated fertilizer grains and the super absorbent polymer particles in firm attachment.

15. The method defined in claim 14 further including a step of applying fatty acids to the fertilizer grains in conjunction with applying the resin coating to the fertilizer grains.

16. The method defined in claim 15 further including a step of degreasing the resin coated fertilizer grains by removing the fatty acids by applying metal hydroxide to the fertilizer grains to leave pores in the resin coating.

17. The method defined in claim 16 further including a step of introducing the degreased resin coated fertilizer grains into a mixture of a monomer and stirring to overcome immiscibility of the monomer and to evenly coat the grains.

18. The method defined in claim 17 further including a step of air drying and applying a powder of super absorbent polymer and maintaining separation of the coated grains from vessel walls and from each other.

* * * * *